United States Patent
Jin et al.

[11] Patent Number: 6,063,874
[45] Date of Patent: May 16, 2000

[54] POLYETHERIMIDE RESIN/POLYESTER RESIN BLENDS

[75] Inventors: Yimin Jin; Martin Lindway, both of Newburgh; Kang Xi; Raymond Utley, both of Mt. Vernon, all of Ind.

[73] Assignee: General Electric Co., Pittsfield, Mass.

[21] Appl. No.: 09/143,589

[22] Filed: Aug. 31, 1998

[51] Int. Cl.⁷ .............................. C08G 65/48; C08L 71/12
[52] U.S. Cl. .......................... 525/390; 525/418; 525/451; 525/932; 524/115; 524/154
[58] Field of Search ...................................... 525/390, 418, 525/451, 932; 524/115, 154

[56] References Cited

U.S. PATENT DOCUMENTS

| | | |
|---|---|---|
| 3,803,085 | 4/1974 | Takehoshi et al. . |
| 3,814,869 | 6/1974 | De Luca . |
| 3,847,867 | 11/1974 | Heath et al. . |
| 3,850,885 | 11/1974 | Takekoshi et al. . |
| 3,852,242 | 12/1974 | White . |
| 3,855,178 | 12/1974 | White et al. . |
| 3,905,942 | 9/1975 | Takekoshi et al. . |
| 3,972,902 | 8/1976 | Heath et al. . |
| 3,983,093 | 9/1976 | Williams, III et al. . |
| 4,141,927 | 2/1979 | White et al. . |
| 4,508,861 | 4/1985 | Avakian . |
| 4,548,997 | 10/1985 | Mellinger et al. ...................... 525/433 |
| 4,687,819 | 8/1987 | Quinn et al. ............................ 525/425 |
| 5,284,903 | 2/1994 | Minnick . |
| 5,439,987 | 8/1995 | Scott et al. ............................. 525/425 |

FOREIGN PATENT DOCUMENTS 0 383 977   8/1990   European Pat. Off. .

OTHER PUBLICATIONS

Kirk–Othmer Encyclopedia of Chemical Technology, Fourth Edition, vol. 19, pp. 609–653, John Wiley & Sons (1996).

*Primary Examiner*—Nathan M. Nutter

[57] ABSTRACT

Color stable thermoplastic resin compositions include a polyetherimide resin, polyester resin and phosphorus and/or phenol containing color stabilizers, and exhibit resistance to elevated temperature, elimination of black specks, and improved mechanical properties.

21 Claims, No Drawings

POLYETHERIMIDE RESIN/POLYESTER RESIN BLENDS

FIELD OF THE INVENTION

The present invention relates to thermoplastic resin blends, more specifically to certain color stable blends of polyetherimide resins and polyester resins.

BACKGROUND

Blends of polyetherimide resins and polyester resins that form transparent articles are derived predominantly from alicylic hydrocarbon diol, and a carbocyclic di-carboxylic acid, such as poly ethylene terephthalate as disclosed in U.S. Pat. No. 4,141,927 (hereby incorporated by reference), while those disclosed in U.S. Pat. No. 5,439,987, which are derived predominantly from cyclohexanedimethanol and a carbocyclic dicarboxylic acid, such as, for example, a poly (cyclohexane-dimethanol terephthalate) resin, are said to provide improved impact strength. Blends of polyetherimide resins and copolyesters of terephthalic acid and/or isoterephthalic acid, 1,4-cyclohexanedimethanol and ethylene glycol, that is, certain poly(cyclohexane-1,4-dimethylene-co-ethylene terephthalate) resins that are said to exhibit a high flexural modulus are also disclosed in U.S. Pat. No. 5,439,987.

When these polyetherimide-polyester blends are utilized in molding large parts or making blends with other polymers, a color shift often results in increased rejection rates and other quality issues. Consequently, polyetherimide-polyester blends that exhibit color stability, resistance to elevated temperature and further improvements are desired.

SUMMARY OF THE INVENTION

In a first embodiment, the present invention is directed to a visually clear thermoplastic resin composition, comprising a mixture, based on 100 parts by weight ("pbw") of the thermoplastic resin composition, of:

(a) from about 60 to about 99 pbw of a polyetherimide resin, (b) from about 1 to about 40 pbw of at least one polyester resin; and (c) up to about 1 pbw stabilizer, said stabilizer being phosphorous-containing, phenol containing, or a mixture thereof.

DETAILED DESCRIPTION OF THE INVENTION

In a preferred embodiment, the thermoplastic resin composition of the present invention comprises, based on 100 pbw of the thermoplastic resin composition, a mixture of (a) from about 60 to about 99 pbw, more preferably from about 75 to about 90 pbw, of a polyetherimide resin; (b) from about 1 to about 40 pbw, more preferably from about 10 to about 25 pbw of at least one polyester resin; and (c) up to about 1 pbw, more preferably about 0.05 to about 0.5 pbw of phosphorous or phenolic stabilizer or a mixture thereof.

Polyetherimide Resins

The polyetherimide resins useful with the present invention are known compounds whose preparation and properties are described in U.S. Pat. Nos. 3,803,085 and 3,905,942, each of which is incorporated herein by reference.

Preferably, the polyetherimide used for preparing the blends of this invention comprises more than 1, typically from about 10 to 1000 or more, and more preferably from about 10 to about 500 structural units, of the formula (I):

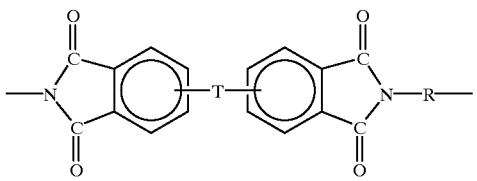

wherein T is —O— or a group of the formula —O—Z—O— wherein the divalent bonds of the —O— or the —O—Z—O— group are in the 3,3', 3,4', 4,3', or the 4,4' positions; Z includes, but is not limited to, a divalent radical of formulae (II).

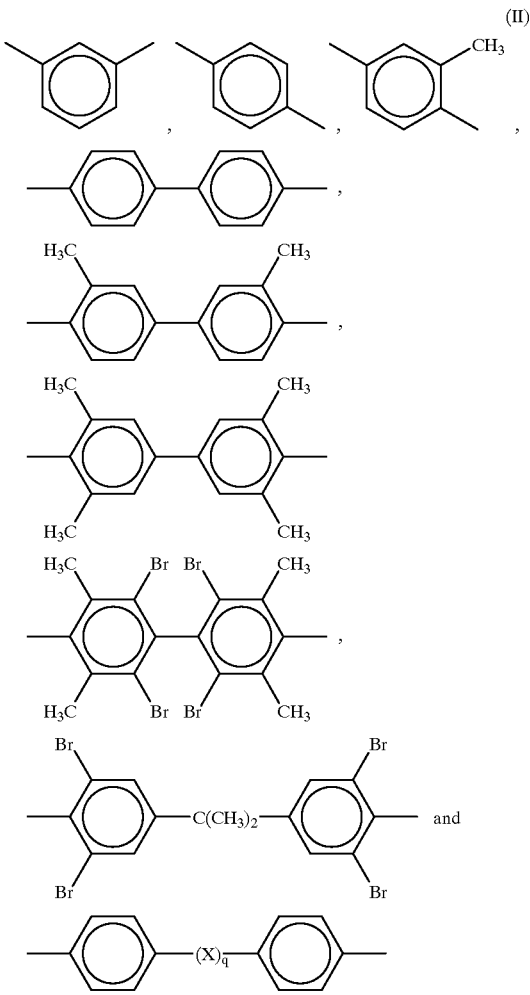

wherein X includes, but is not limited to, divalent radicals of the formulae (III):

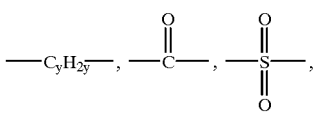

-continued

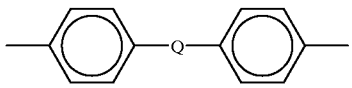

wherein y is an integer from 1 to about 5, and q is 0 or 1; R includes, but is not limited to, a divalent organic radical: (a) aromatic hydrocarbon radicals having from 6 to about 20 carbon atoms and halogenated derivatives thereof, (b) alkylene radicals having from about 2 to about 20 carbon atoms, (c) cycloalkylene radicals having from about 3 to about 20 carbon atoms, and (d) divalent radicals of the general formula (IV):

(IV)

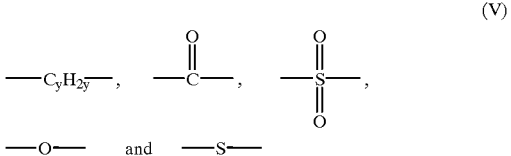

where Q includes, but is not limited to, the formulae (V):

(V)

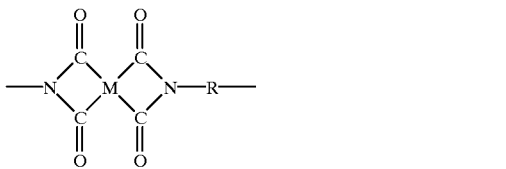

where y is an integer from about 1 to about 5.

In one embodiment, the polyetherimide may be a copolymer which, in addition to the etherimide units described above, further contains polyimide structural units of the formula (VI):

(VI)

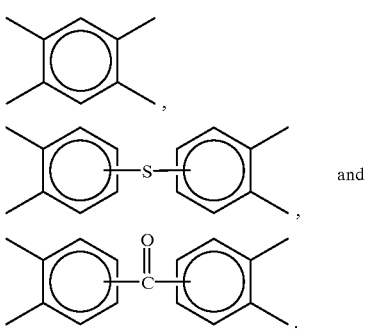

wherein R is as previously defined for formula (I) and M includes, but is not limited to, formula (VII):

(VII)

The polyetherimide can be prepared by any of the methods well known to those skilled in the art, including the reaction of an aromatic bis(ether anhydride) of the formula (VIII):

(VIII)

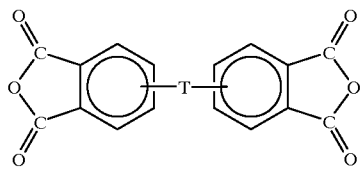

with an organic diamine of the formula (IX):

$$H_2N—R—NH_2 \qquad (IX)$$

wherein T and R are defined as described above in formula (I). In general the reactions can be carried out employing well-known solvents, e.g., o-dichlorobenzene, m-cresol/toluene and the like to effect interaction between the anhydride of formula (VIII) and the diamine of formula (IX), at temperatures of about 100° C. to about 250° C. Alternatively, the polyetherimide can be prepared by melt polymerization of aromatic bis(ether anhydride)s and diamines accomplished by heating a mixture of the ingredients to elevated temperatures with concurrent stirring. Generally melt 8CU-5793 polymerizations employ temperatures of about 200° C. to about 400° C. Chain stoppers and branching agents may also be employed in the reaction.

Examples of specific aromatic bis(ether anhydrides) and organic diamines are disclosed, for example, in U.S. Pat. Nos. 3,972,902 and 4,455,410, which are incorporated herein by reference.

Illustrative examples of aromatic bis(ether anhydride)s of formula (VIII) include: 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)4'-(3,4-dicarboxyphenoxy)diphenyl sulfone dianhydride, as well as various mixtures thereof.

A preferred class of aromatic bis(ether anhydride)s included by formula (VIII) above includes, but is not limited to, compounds wherein T is of the formula (X):

(X)

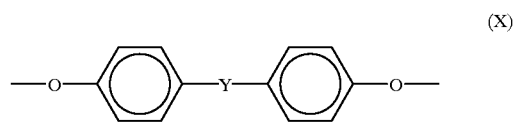

and the ether linkages, for example, are preferably in the 3,3', 3,4', 4,3', or 4,4' positions, and mixtures thereof, and where Y includes, but is not limited to the formulae (XI):

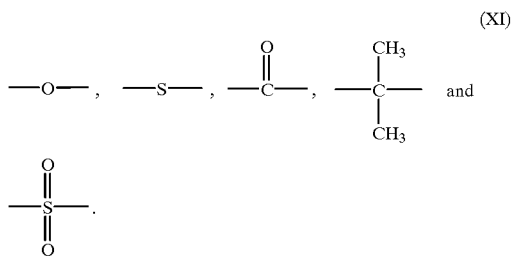

(XI)

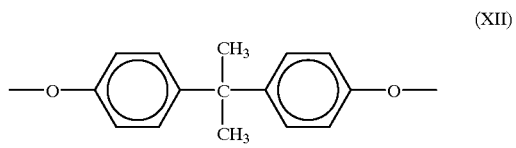

(XII)

When polyetherimide/polyimide copolymers are employed, a dianhydride, such as pyromellitic anhydride, is used in combination with the bis(ether anhydride).

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

Suitable organic diamines of formula (IX) include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl) ether; bis(p-beta-methyl-o-aminophenyl)benzene; 1,3-diamino-4-isopropylbenzene; 1,2-bis(3-aminopropoxy) ethane; benzidine; m-xylylenediamine; 2,4-diaminotoluene; 2,6-diaminotoluene; bis(4-aminocyclohexyl)methane; 3-methylheptamethylenediamine; 4,4-dimethylheptamethylenediamine; 2,11-dodecanediamine; 2,2-dimethylpropylenediamine; 1,18-octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1-4-cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine and mixtures of such diamines.

Generally, useful polyetherimides have a melt index of between 0.1 and 10 grams per minute ("g/min"), as measured by American Society for Testing Materials ("ASTM") D1238 at 337° C., using a 6.6 kilogram ("kg") weight.

In a preferred embodiment, the polyetherimide resin of the present invention resin has a weight average molecular weight of from 10,000 to 150,000 grams per mole ("g/mole"), as measured by gel permeation chromatography, using a polystyrene standard. Such polyetherimide resins typically have an intrinsic viscosity [η] greater than about 0.2 deciliters per gram, preferably about 0.35 to about 0.7 deciliters per gram measured in m-cresol at 25° C.

Included among the many methods of making the polyetherimide are those disclosed in U.S. Pat. Nos. 3,847,867, 3,814,869, 3,850,885, 3,852,242, 3,855,178, and 3,983,093. These patents are incorporated herein by reference for the purpose of teaching, by way of illustration, general and specific methods for preparing polyetherimide for use in the blends of this invention.

In a preferred embodiment, the polyetherimide resin comprises structural units according to formula (I) wherein each R is independently paraphenylene or metaphenylene and T is a divalent radical of the formula (XII):

Polyester Resins

The polyester resins of the composition of the present invention are typically obtained through the condensation or ester interchange polymerization of a diol or diol equivalent with a diacid or diacid equivalent and each comprise recurring structural units according to formula (XIII):

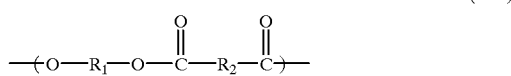

(XIII)

wherein $R_1$ represents the residue of the diol or diol equivalent ("diol residue"), $R_2$ represents the residue of the diacid or diacid equivalent ("diacid residue"), and each $R_1$ and $R_2$ is independently a divalent acyclic hydrocarbon radical, a divalent alicyclic hydrocarbon radical or a divalent aromatic hydrocarbon radical.

As used herein, the terminology "acyclic hydrocarbon radical" means a straight chain or branched saturated hydrocarbon radical, preferably containing about 2 to about 12 carbon atoms per radical, such as, for example, dimethylene, trimethylene, tetramethylene, hexamethylene and octamethylene, among others.

As used herein, the terminology "alicyclic hydrocarbon radical" means a hydrocarbon radical containing one or more saturated hydrocarbon rings, preferably containing about 4 to about 10 carbon atoms per ring, per radical which may optionally be substituted on one or more of the rings with one or more alkyl or alkylene groups, each preferably containing about 2 to about 6 carbon atoms per group and which, in the case of two or more rings, may be fused rings, such as, for example, 2,2,4,4-tetramethyl-1,3-cyclobutylene, 1,4-cyclohexylene, cyclohexylene-1,4-dimethylene, and 1,4-cyclooctylene, among others.

As used herein, the term "aromatic hydrocarbon radical" means a hydrocarbon radical containing one or more aromatic rings per radical, which may optionally be substituted on the one or more aromatic rings with one or more alkyl or alkylene groups, each preferably containing about 2 to about 6 carbon atoms per group and which, in the case of two or more rings, may be fused rings, such as, for example, 1,2-phenylene, 1,3-phenylene, 1,4-phenylene, 2,6-naphthalene, and 2,7-phenathrylene, among others.

Suitable diols include acyclic diols such as, for example, ethylene glycol, 1,3-propylene glycol, 1,4-butane glycol, 1,5-pentane diol, 1,6-hexane diol, 1,7-heptane diol, 1,8-octane diol, 1,9-nonane diol, 1,10-decane diol, 1,12-dodecane diol; alicyclic diols such as, for example, 2,2,4,4-tetramethyl-1,3-cyclobutane diol, 3,4-cyclopentanediol, 1,4-cyclohexanedimethanol, including cis-1,4-cyclohexanedimethanol and trans-1,4-cyclohexanedimethanol; and aromatic diols such as, for example, bisphenol A and hydroquinone, among others. Suitable diol equivalents include corresponding esters and ethers, such as for example, dialkyl esters and diaryl esters, among others.

Suitable diacids include, for example, dicarboxylic acids, such as, for example, phthalic acid, isophthalic acid, terephthalic acid, dimethyl terephthalic acid, oxalic acid, malonic acid, succinic acid, glutaric acid, adipic acid, pimelic acid, suberic acid, azelaic acid, sebacic acid, dimethyl malonic acid, 1,12-dodecanoic acid cis-1,4-cyclohexane dicarboxylic acid, trans-1,4-cyclohexane dicarboxylic acid, 4,4'-bisbenzoic acid, and naphthalene-2,6-dicarboxylic acid, among others. Suitable diacid equivalents include, for example, corresponding anhydride, ester or halide derivatives, such as, for example, phthalic anhydride, dimethyl terephthalate, and succinyl chloride, among others.

In a preferred embodiment, the polyester resins have a number average molecular weight of about 10,000 to about 100,000 g/mole, more preferably about 15,000 to about 50,000 g/mole, as measured by gel permeation chromatography using a polystyrene standard.

Methods for making polyester resins are well know in the art, see for example, Kirk-Othmer Encyclopedia of Chemical Technology, Fourth Edition, Vol. 19 at pp. 609–653, John Wiley & Sons (1996).

Stabilizers

The stabilizer of the present invention is capable of stabilizing the color of the polyetherimide-polyester blend and inhibiting black specks, while maintaining mechanical properties. Possible stabilizers include phosphorus-containing and phenol-containing stabilizers, among others, and mixtures thereof. Preferably, at least a portion of the stabilizer is a mixture of phosphorus and phenol at a ratio of about 1:2 to about 2:1.

Phosphorus-containing stabilizer compounds suitable for use as the phosphorus stabilizer component of the present invention are those that exhibit a low volatility. The volatility of a phosphorous-containing stabilizer may be measured by thermogravimetric analysis, that is, by heating a sample of the stabilizer and monitoring the relative amount of a sample of the stabilizer that remains non-evaporated as the temperature of the sample is increased. In a preferred embodiment, greater than or equal to about 10 percent by weight ("wt %"), more preferably greater than or equal to about 30 wt %, even more preferably greater than or equal to about 50 wt %, and still more preferably greater than or equal to about 70 wt %, of the initial amount of a sample of phosphorous-containing stabilizer remains upon heating of the sample from room temperature to 300° C. at a heating rate of 20° C. per minute under an inert atmosphere, such as, for example, nitrogen.

In a preferred embodiment, the phosphorous-containing compound is a compound according to the structural formula (XIV):

P—R'$_a$  (XIV)

wherein each R' is independently H, alkyl, alkoxyl, aryl, aryloxy or oxo, and "a" is 3 or 4.

As used herein, "alkyl" means a straight or branched chain alkyl group, preferably a (C$_1$–C$_{18}$) alkyl group, wherein the notation (C$_n$–C$_m$) means a group containing from n to m carbon atoms per group and includes, for example methyl, ethyl n-butyl, isobutyl, tert-butyl, octyl, decyl, stearyl. As used herein, "alkoxyl" means a straight or branched alkoxyl group, preferably a (C$_1$–C$_{18}$) alkoxyl group, and includes, for example, methoxyl, ethoxyl, butoxyl, and nonyloxyl.

As used herein, "aryl" means a radical containing an unsaturated ring of six carbon atoms, which may optionally be substituted with one or more alkyl groups, and includes, for example, phenyl, tolyl, and xylyl.

As used herein, "aryloxy" means an oxygen radical that is substituted with an unsaturated ring of six carbon atoms, which itself may optionally be substituted with one or more alkyl groups, and includes, for example, phenoxy.

As used herein, "oxo" means a divalent oxygen radical.

In a more highly preferred embodiment the phosphorous-containing stabilizer is selected from the group consisting of the reaction product of phosphorus trichloride with 1,1biphenyl and 2,4-t-butylphenol, 2-[[2,4,8,10 tetrakis(1,1-dimethylethyl)dibenzo [d,f,][1,2,3]dioxaphosphenin-6-yl]oxy]-N,N-bis[2-[[2,4,8,10-tetrakis(1,1-dimethylethyl) dibenzo [d,f][1,2,3]dioxphosphepin-6-yl]oxy]-ethyl] ethanamine, sodium phenyl phosphonate and 2,4-di-tert-butylphenol phosphite and mixtures thereof. Most preferably, the phosphorus-containing stabilizer comprises 2,4-di-tert-butylphenol phosphite.

In a preferred embodiment, the composition of the present invention further comprises a sterically hindered phenolic stabilizer.

Suitable phenolic stabilizers include, for example, alkylated monophenols, polyphenols and alkylated reaction products of polyphenols with dienes, such as, for example, N,N'-16-hexanedyl bis[3,5-bis(1,1-dimethylethyl)4-hydroxybenzenpropanamide], tetra-cis(methylene)-3,5-di-t-butyl-4-hydroxycinnamate, butylated reaction products of par-cresol and dicyclopentadiene, alkylated hydroquinones, hydroxlated thiodiphenyl ethers, alkylidene-bisphenols, benzyl compounds, acylaminophenols, esters of beta-(3,5-di-tert-butyl-r-hydroxylphenol)-propionic acid with monohydric or polyhydric alcohols, esters of beta-(5-tert-butyl-4-hydroxy-3-methylphenyl)-propionic acid with monohydric or polyhydric alcohols, esters of beta-(5-tert-butyl-4-hydroxy-3-methylphentyl) propionic acid with mono-or polyhydric alcohols.

In a preferred embodiment, the thermoplastic resin composition of the present invention contains a phenolic stabilizer selected from N,N'-16-hexanedyl bis[3,5-bis(1,1-dimethylethyl)4-hydroxybenzenepropanamide], the butylated reaction product of p-cresol and dicylopentadiene, terakis(methylene(3,5-di-butyl-4-hydroxyhydrocinnamate) and mixtures thereof, and most preferably, comprises terakis(methylene(3,5-di-t-butyl-r-hydroxyhydrocinnamate).

In a preferred embodiment, the thermoplastic resin composition of the present invention further comprises about 0.01 to about 0.5 phosphorous stabilizer and about 0.01 to about 0.5 pbw phenolic stabilizer, more preferably about 0.02 to about 0.2 phosphorous stabilizer and about 0.02 to about 0.2 pbw phenolic stabilizer, even more preferably about 0.05 to about 0.15 phosphorous stabilizer and about 0.05 to about 0.15 pbw phenolic stabilizer, per 100 pbw of the thermoplastic resin composition.

Other Additives

The thermoplastic resin composition of the present invention may optionally also contain various conventional additives, including fillers and reinforcing agents, such as, for example, silicates, TiO$_2$, glass fibers, carbon black, graphite, calcium carbonate, talc, mica and other additives such as, for example, UV absorbers, light stabilizers, lubricants, plasticizers, pigments, dyes, colorants, anti-static agents, blowing agents.

The preparation of the compositions of the present invention is normally achieved by merely blending the ingredients under conditions for the formation of an intimate blend. Such conditions often include solution blending or melt mixing in single or twin screw type extruders, mixing bowl, or similar mixing devices which can apply a shear to the components. Twin screw extruders are often preferred due to their more intensive mixing capability over single screw extruders. It is often advantageous to apply a vacuum to the blend through at least one vent port in the extruder to remove volatile impurities in the composition.

The composition of the present invention can be molded into useful articles, such as, for example, heat resistant containers, by a variety of means such as, for example, injection molding and extrusion, among others conventionally known in the art.

EXAMPLES

The thermoplastic resin compositions of samples 1–5 were made by combining the components using a vacuum venting on a 2.5 inch Egan single screw extruder at 100 rpm using barrel set temperatures of 540–600° F. All extrudates were quenched in water, pelletized, and dried in a circulating air oven at 300° F. for 4 hours before testing.

Pellets were tested for melt flow rate at 295° C. according to ASTM D1238, using a 6.6 kg weight.

Molded parts were tested for: heat distortion temperature ("HDT") at 264 pounds per square inch ("psi") with 0.25 inch flex bars, and tensile properties, elongation, tensile at yield and break, and modulus with 0.125 inch tensile bars; all according to ASTM D638. Meanwhile, impact properties, notched and reverse notched izod were tested with 0.125 inch izod bars according to ASTM D256.

Finally, color shift determinations were carried out by dwell study under two different residence times: 650° F. for 25 seconds (Table IV) and 650° F. for 2 minutes (Table III). Color values were measured on 0.125 inch color chips using a MacBeth Color Eye 7000 spectrophotometer with C illuminant (average daylight) under transmission mode with a 2° observer.

| | |
|---|---|
| Yellowness Index (YI) | an overall measure of yellowness; |
| L* | a measurement of the lightness of an object ranging from 0 (black) to 100 (white); |
| a* | a measurement of redness (positive a*) or greenness (negative a*); and |
| b* | a measurement of yellowness (positive b*) or blueness (negative b*); | are measured using CIELab method (Commission International de l'Eclairage) percent transmission, a percentage of light which is transmitted through the chip is measured by FMC-2 method developed by Friele, MacAdam and Chickering.

The compositions of samples 1–5 are set forth in Table I, the properties are set forth in Table II, and the color results after dwell study at 650° F. for 25 seconds are set forth in Table III, while the color results after the dwell study at 650° F. for 2 minutes are set forth in Table IV.

| | |
|---|---|
| PEI | Polyetherimide resin, having a melt index of 1.8 g/min at 337° C. (Ultem ® 1010, General Electric Company, Pittsfield, MA); |
| PET | Poly(ethylene terephthalate) resin having an intrinsic viscosity of 0.57 (Merge 3903, E.I. duPont de Nemours and Company, Wilmington, DE), |
| PCT | Poly(cyclohexanedimethanol terephthalate) resin having a nominal inherent viscosity of 0.77, (Ektar ™ PCT 13787 resin, Eastman Chemical Company, Kingsport, TN); |
| PETG | Poly(ethylene-co-cyclohexane-1,4-dimethylene terephthalate) resin having a nominal inherent viscosity of 0.75, (Eastar ™ PETG Copolyester 6763 resin, Eastman Chemical Company); |
| Irganox ™ 1010 | Terakis(methylene(3,5-di-t-butyl-4-hydroxyhydrocinnamate) (Ciba Specialty Chemicals Corporation, Tarrytown, NY); |
| Irgafos ™ 168 | 2,4-di-tert-(butylphenyl) phosphite (Ciba Specialty Chemicals Corporation); and |
| Doverphos S9228 | Bis(2,4-dicumylphenyl pentaerythritol diphosphite (Dover Chemical Corporation, Dover, OH) |

TABLE I

| | Sample Nos. | | | | |
|---|---|---|---|---|---|
| Components | 1 | 2 | 3 | 4 | 5 |
| PEI | 85.00 | 84.80 | 84.75 | 84.75 | 84.75 |
| PET | 15.00 | 15.00 | 15.00 | 15.00 | |
| PCT | | | | | 7.00 |
| PETG | | | | | 8.00 |
| Irganox 1010 | | 0.10 | 0.15 | 0.15 | 0.15 |
| Irgafos 168 | | 0.10 | 0.10 | | |
| Doverphos S9228 | | | | 0.10 | 0.10 |

TABLE II

| | Sample Nos. | | | | |
|---|---|---|---|---|---|
| Properties | 1 | 2 | 3 | 4 | 5 |
| Melt Index (g/min) | 0.82 | 0.95 | 0.92 | 0.82 | 0.56 |
| HDT (° C.) | 167 | 169 | 166 | 165 | 172 |
| Tensile Strength (psi) | 16400 | 16300 | 16300 | 16000 | 15100 |
| Tensile @ Break (psi) | 13800 | 11400 | 12300 | 11500 | 11700 |
| Tensile Elongation (%) | 7 | 19 | 29 | 48 | 71 |
| Tensile Modulus (psi) | 550000 | 525000 | 526000 | 528000 | 491000 |
| Izod Notched (ft-lb/in) | 0.5 | 0.4 | 0.4. | 0.4 | 0.4 |
| Izod. Rev-notched (ft-lb/in) | 16 | 13.9 | 17.9 | 19 | 38.3 |

TABLE III

| Color Values | Sample Nos. | | | | |
|---|---|---|---|---|---|
| (650° F./2 min.) | 1 | 2 | 3 | 4 | 5 |
| L* | 76.61 | 77.5446 | 79.657 | 82.942 | 86.159 |
| a* | −0.248 | −0.482 | −2.095 | −6.457 | −7.972 |
| b* | 67.500 | 62.905 | 62.015 | 51.870 | 44.639 |
| Yellowness Index (YI) | 103.641 | 96.641 | 93.181 | 77.675 | 66.690 |
| % Transmission | 50.244 | 52.443 | 56.079 | 62.055 | 68.307 |

TABLE IV

| Color Values | Sample Nos. | | | | |
|---|---|---|---|---|---|
| (650° F./25 sec.) | 1 | 2 | 3 | 4 | 5 |
| L* | 80.670 | 80.887 | 83.677 | 84.367 | 86.516 |
| a* | −4.475 | −4.475 | −6.411 | −7.511 | −7.629 |
| b* | 60.840 | 56.600 | 53.358 | 46.778 | 41.332 |
| Yellowness Index (YI) | 83.188 | 85.319 | 78.890 | 70.409 | 62.777 |
| % Transmission | 56.820 | 58.268 | 63.454 | 64.775 | 69.025 |

As can be seen in Tables III and IV, sample 1, the control, exhibits significant color difference when molded at two different residence times than sample 4, for example. Sample 5, which comprised the stabilizers and different polyesters provided not only better color stability but also better impact and higher heat distortion temperature.

The polyetherimide-polyester blends of the present invention have improved color stability over the prior art, thereby reducing rejection rates, improving usefulness and color consistency and eliminating black specks, while maintaining or improving mechanical properties.

What is claimed is:

1. A thermoplastic resin composition, comprising a mixture, based on 100 pbw of the thermoplastic resin composition, of:
   (a) from about 60 to about 99 pbw of a polyetherimide resin;
   (b) from about 1 to about 40 pbw of at least one polyester resin; and
   (c) from about 0.02 pbw to about 1 pbw stabilizer to increase the color stability of the thermoplastic resin composition, wherein said stabilizer is a phenol-containing or phosphorus-containing stabilizer or a mixture thereof.

2. The composition of claim 1, wherein the composition comprises from about 75 to about 90 pbw of said polyetherimide resin and from about 10 to about 25 pbw of said polyester resin.

3. The composition of claim 1, wherein the polyetherimide resin comprises structural units of the formula (I):

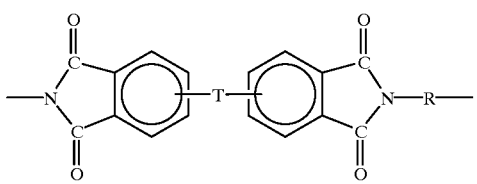

wherein T is —O— or a group of the formula —O—Z—O— wherein the divalent bonds of the —O— or the —O—Z—O— group are in the 3,3', 3,4', 4,3', or the 4,4' positions; Z is a divalent radical selected from the group consisting of formulae (II):

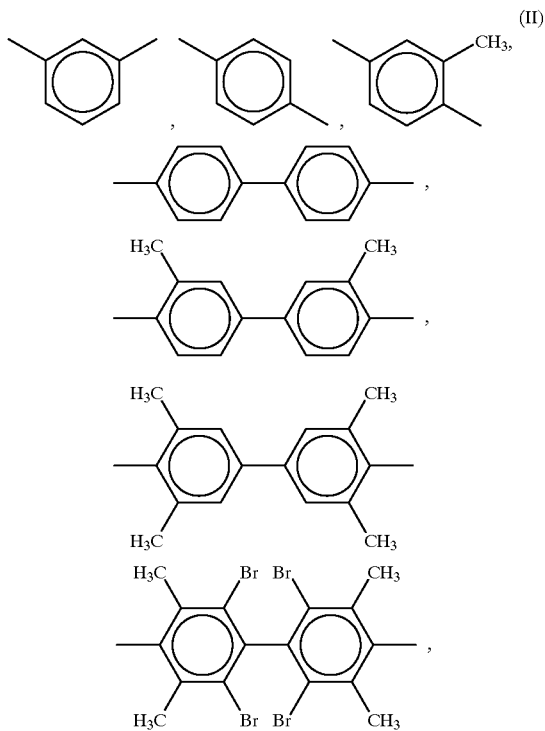

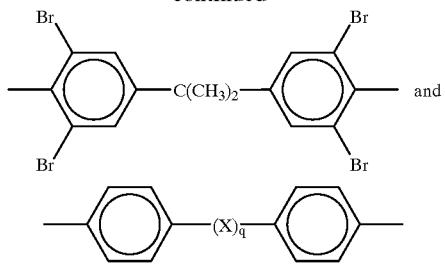

wherein X is of the formulae (III):

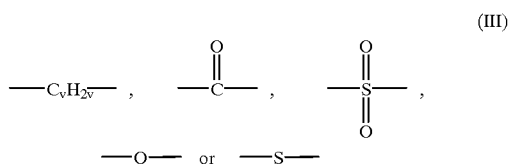

wherein y is an integer from about 1 to about 5, and q is 0 or 1; R is: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, or (d) divalent radicals of the general formula (IV):

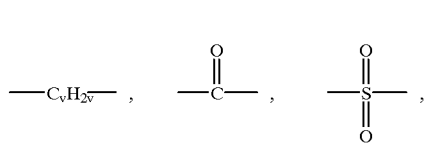

where Q is of the formulae (V):

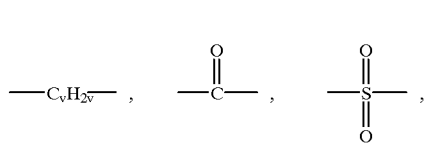

where y is an integer from about 1 to about 5.

4. The composition of claim 1, wherein the polyetherimide resin is the reaction product formed by melt polymerization of 2,2-bis[4-(3,4-dicarboxyphenoxy)phenyl]propane dianhydride with metaphenylene diamine.

5. The composition of claim 1, wherein said polyester resin is obtained through the condensation or ester interchange polymerization of a diol or diol equivalent with a diacid or diacid equivalent and said diol, said diol equivalent, said diacid and said diacid equivalent each comprise recurring structural units according to formula (XIII):

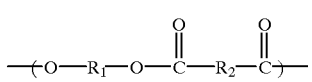

wherein $R_1$ is the residue of said diol or said diol equivalent, $R_2$ is the residue of said diacid or said diacid equivalent, and each of said $R_1$ and said $R_2$ is independently a divalent acyclic hydrocarbon radical, a divalent alicyclic hydrocarbon radical or a divalent aromatic hydrocarbon radical.

6. The composition of claim 1, wherein said stabilizer is a phosphorus containing stabilizer of the formula:

wherein each of said R' is independently H, alkyl, alkoxyl, aryl, aryloxy or oxo, and "a" is 3 or 4.

7. The composition of claim 6, wherein said alkyl is methyl, ethyl n-butyl, isobutyl, tert-butyl, octyl, decyl, or stearyl; said alkoxyl is methoxyl, ethoxyl, butoxyl, or nonyloxyl; said aryl is a radical containing an unsaturated ring of six carbon atoms which are substituted with one or more alkyl groups; said aryloxy is an oxygen radical substituted with an unsaturated ring of six carbon atoms; and said oxo is a divalent oxygen radical.

8. The composition of claim 7, wherein said alkyl group is phenyl, tolyl, or xylyl.

9. The composition of claim 7, wherein said unsaturated ring is substituted with one or more second alkyl groups.

10. A thermoplastic resin composition, comprising a mixture, based on 100 pbw of the thermoplastic resin composition, of:

(a) from about 60 to about 99 pbw of a polyetherimide resin;

(b) from about 1 to about 40 pbw of at least one polyester resin, wherein said polyester resin is a poly(cyclohexane-1,4-dimethylene terephthalate) resin; and (c) up to about 1 pbw stabilizer to increase the color stability of the thermoplastic resin composition, wherein said stabilizer is a phenol-containing or phosphorus-containing stabilizer or a mixture thereof.

11. The composition of claim 1, wherein the composition is in particulate form.

12. The composition of claim 1, wherein said phenol-containing stabilizer comprises a sterically hindered phenolic stabilizer.

13. The composition of claim 1, wherein said phenol-containing stabilizer is alkylated monophenols, polyphenols or alkylated reaction products of polyphenols with dienes.

14. The composition of claim 13, wherein said diene is N,N'-16-hexanedyl bis[3,5-bis(1,1-dimethylethyl)4-hydroxybenzenpropanamide], tetra-cis(methylene)-3,5-di-t-butyl-4-hydroxycinnamate, butylated reaction products of par-cresol and dicyclopentadiene, alkylated hydroquinones, hydroxlated thiodiphenyl ethers, alkylidene-bisphenols, benzyl compounds, acylaminophenols, esters of beta-(3,5-di-tert-butyl-r-hydroxylphenol)-propionic acid with monohydric or polyhydric alcohols, esters of beta-(5-tert-butyl-4-hydroxy-3-methylphenyl)-propionic acid with monohydric or polyhydric alcohols, or esters of beta-(5-tert-butyl-4-hydroxy-3-methylphentyl) propionic acid with mono-or polyhydric alcohols.

15. The composition of claim 1, wherein said stabilizer comprises about 0.01 to about 0.5 pbw of said phosphorous-containing stabilizer and about 0.01 to about 0.5 pbw of said phenol-containing stabilizer.

16. The composition of claim 1, wherein said stabilizer comprises about 0.02 to about 0.2 pbw of said phosphorous-containing stabilizer and about 0.02 to about 0.2 pbw of said phenol-containing stabilizer.

17. The composition of claim 1, wherein said stabilizer comprises about 0.05 to about 0.15 pbw of said phosphorous-containing stabilizer and about 0.05 to about 0.15 pbw of said phenol-containing stabilizer.

18. A thermoplastic article made by molding the composition of claim 1.

19. A thermoplastic resin composition, comprising a mixture, based on 100 pbw of the thermoplastic resin composition, of:

(a) from about 60 pbw to about 99 pbw of a polyetherimide resin comprising structural units of the formula:

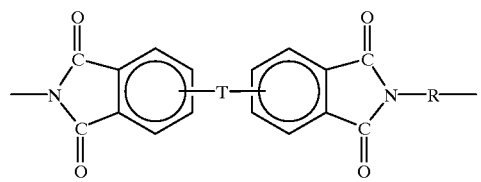

wherein each R is independently paraphenylene or metaphenylene and T is a divalent radical according to the formula:

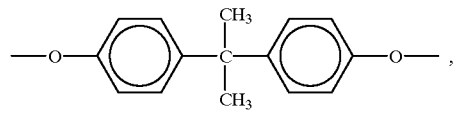

(b) from about 1 to about 40 pbw of a poly(cyclohexane-1,4-dimethylene terephthalate) resin; and (c) up to about 1 pbw phosphorus-containing or phenol-containing stabilizer or mixture thereof.

20. The composition of claim 19, wherein the polyetherimide resin is the reaction product former by melt polymerization of 2,2-bis[4-(3,4-dicarboxyphenoxy)phenyl]propane dianhydride with metaphenylene diamine.

21. The composition of claim 19, wherein the composition comprises from 75 to 90 pbw of the polyetherimide resin, from 10 to 25 pbw poly(cyclohexane-1,4-dimethylene terephthalate) resin, about 0.01 to about 0.5 pbw of said phosphorous-containing stabilizer and about 0.01 to about 0.5 pbw of said phenol-containing stabilizer.

* * * * *